United States Patent
Nguyen et al.

(10) Patent No.: US 12,423,892 B2
(45) Date of Patent: Sep. 23, 2025

(54) RENDERING AND ANCHORING INSTRUCTIONAL DATA IN AUGMENTED REALITY WITH CONTEXT AWARENESS

(71) Applicant: Adobe Inc., San Jose, CA (US)

(72) Inventors: Cuong Nguyen, San Francisco, CA (US); Trung Huu Bui, San Jose, CA (US); Jennifer Healey, San Jose, CA (US); Jane Elizabeth Hoffswell, Seattle, WA (US); Chen Chen, San Diego, CA (US)

(73) Assignee: Adobe Inc., San Jose, CA (US)

( * ) Notice: Subject to any disclaimer, the term of this patent is extended or adjusted under 35 U.S.C. 154(b) by 249 days.

(21) Appl. No.: 18/125,889

(22) Filed: Mar. 24, 2023

(65) Prior Publication Data

US 2024/0320886 A1    Sep. 26, 2024

(51) Int. Cl.
*G06T 11/60* (2006.01)
*G06F 3/01* (2006.01)
*G06N 3/08* (2023.01)

(52) U.S. Cl.
CPC .............. *G06T 11/60* (2013.01); *G06F 3/012* (2013.01); *G06F 3/017* (2013.01); *G06N 3/08* (2013.01); *G06T 2200/24* (2013.01)

(58) Field of Classification Search
None
See application file for complete search history.

(56) References Cited

U.S. PATENT DOCUMENTS

| | | | | |
|---|---|---|---|---|
| 9,965,897 B2* | 5/2018 | Ryznar | .................. | G06F 3/0346 |
| 10,366,521 B1* | 7/2019 | Peacock | .............. | G02B 27/017 |
| 10,929,679 B1* | 2/2021 | Keyvani | ................ | G06V 20/46 |
| 2014/0114896 A1* | 4/2014 | Hawkins | ................ | G06N 20/00 |
| | | | | 706/46 |
| 2014/0298227 A1* | 10/2014 | Gass | ...................... | G06Q 50/04 |
| | | | | 715/771 |
| 2014/0310595 A1* | 10/2014 | Acharya | ................. | G06F 3/011 |
| | | | | 715/706 |
| 2016/0125654 A1* | 5/2016 | Shikoda | ............. | G02B 27/0101 |
| | | | | 345/633 |
| 2018/0129276 A1* | 5/2018 | Nguyen | ................ | G06F 3/0304 |

(Continued)

OTHER PUBLICATIONS

Lang, Yining, et al., "Virtual Agent Positioning Driven by Scene Semantics in Mixed Reality", at https://drive.google.com/file/d/1JF-o5wS_R6JfTasgBXd7iONyaxFzxpQs/view, 2019, pp. 1-9.

(Continued)

*Primary Examiner* — Edward Martello
(74) *Attorney, Agent, or Firm* — Kilpatrick Townsend & Stockton LLP

(57) ABSTRACT

In some examples, an augmented reality (AR) server receives instructional data to be rendered in AR. The AR rendering server extracts multiple instruction steps from the instructional data and determines multiple spatial identifiers associated with the multiple instruction steps respectively. The multiple spatial identifiers correspond to multiple spatial objects in a real-world environment. The AR rendering server then generates AR rendering data for displaying the multiple instruction steps on an AR device at selected locations associated with the multiple spatial objects in the real-world environment. The AR rendering data is then transmitted to the AR device.

19 Claims, 10 Drawing Sheets

(56) References Cited

U.S. PATENT DOCUMENTS

| | | | |
|---|---|---|---|
| 2019/0325660 A1* | 10/2019 | Schmirler | G06F 3/011 |
| 2020/0273255 A1* | 8/2020 | Godin | G09B 5/02 |
| 2022/0237399 A1* | 7/2022 | Kowalski | G06V 20/52 |
| 2023/0014775 A1* | 1/2023 | Dotan-Cohen | H04L 51/046 |
| 2023/0161648 A1* | 5/2023 | Kulkarni | G06F 9/542 |
| | | | 719/318 |

OTHER PUBLICATIONS

Lindlbauer, David, et al., "Context-Aware Online Adaptation of Mixed Reality interfaces", The 32$^{nd}$ Annual ACM Symposium on User Interface Software and Technology, Oct. 20-23, 2019, pp. 147-160.

Microsoft, "Overview of Dynamics 365 Guides" Available Online at https://learn.microsoft.com/en-us/dynamics365/mixed-reality/guides/, Feb. 1, 2023, pp. 1-934.

Apple, Inc. Augmented Reality "Introducing RoomPlan", Available Online at https://developer.apple.com/augmented-reality/roomplan/, 2023, pp. 1-3.

\* cited by examiner

Edit Step 8

Step Text:

402 — Take the mug out of microwave, lift the plate carefully (to let steam escape) and check the egg. If the white is not completely set, cover and continue to microwave in 10-second intervals until the egg white is opaque.

Timer (Seconds):

404 — 10

Caveats:

406 — The time varies with the power of the microwave and may take up to 60 seconds.

Submit

*FIG. 4*

RENDERING AND ANCHORING INSTRUCTIONAL DATA IN AUGMENTED REALITY WITH CONTEXT AWARENESS

TECHNICAL FIELD

This disclosure relates generally to augmented reality. More specifically, but not by way of limitation, this disclosure relates to rendering and anchoring instructional data in augmented reality with context awareness.

BACKGROUND

Procedural instructional documents contain step by steps guides for different activities, such as education, equipment maintenance, inventory management, cleaning, and cooking. The steps in the procedural instructional document are associated with different objects or locations. Many of such instructional documents are difficult to follow. It takes a lot of time for users to associate abstract document content with concrete objects in a three-dimensional scene. Augmented Reality (AR) display technologies are progressing rapidly. They provide interactive experience by combining computer-generated content with the real-world environment. However, simply showing a full document in AR is not helpful because users still have to manually browse the document to look for relevant content.

SUMMARY

Certain embodiments involve rendering and anchoring instructional data in augmented reality with context awareness. In one example, a computing system receives instructional data to be rendered in augmented reality (AR). The computing system extracts multiple instruction steps from the instructional data and predicts multiple spatial identifiers associated with the multiple instruction steps respectively. The multiple spatial identifiers correspond to multiple spatial objects in areal-world environment. The computing system then rendering the multiple instruction steps to be displayed via an AR device at selected locations associated with the multiple spatial objects to generate AR rendering data for the multiple instruction steps. The respective multiple spatial identifiers and a spatial profile of the real-world environment are used for generating the AR rendering data. The AR rendering data is then transmitted to the AR device.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings.

FIG. 4 depicts an example of a GUI for editing extracted time information, according to certain embodiments of the present disclosure.

DETAILED DESCRIPTION

Figure 1:
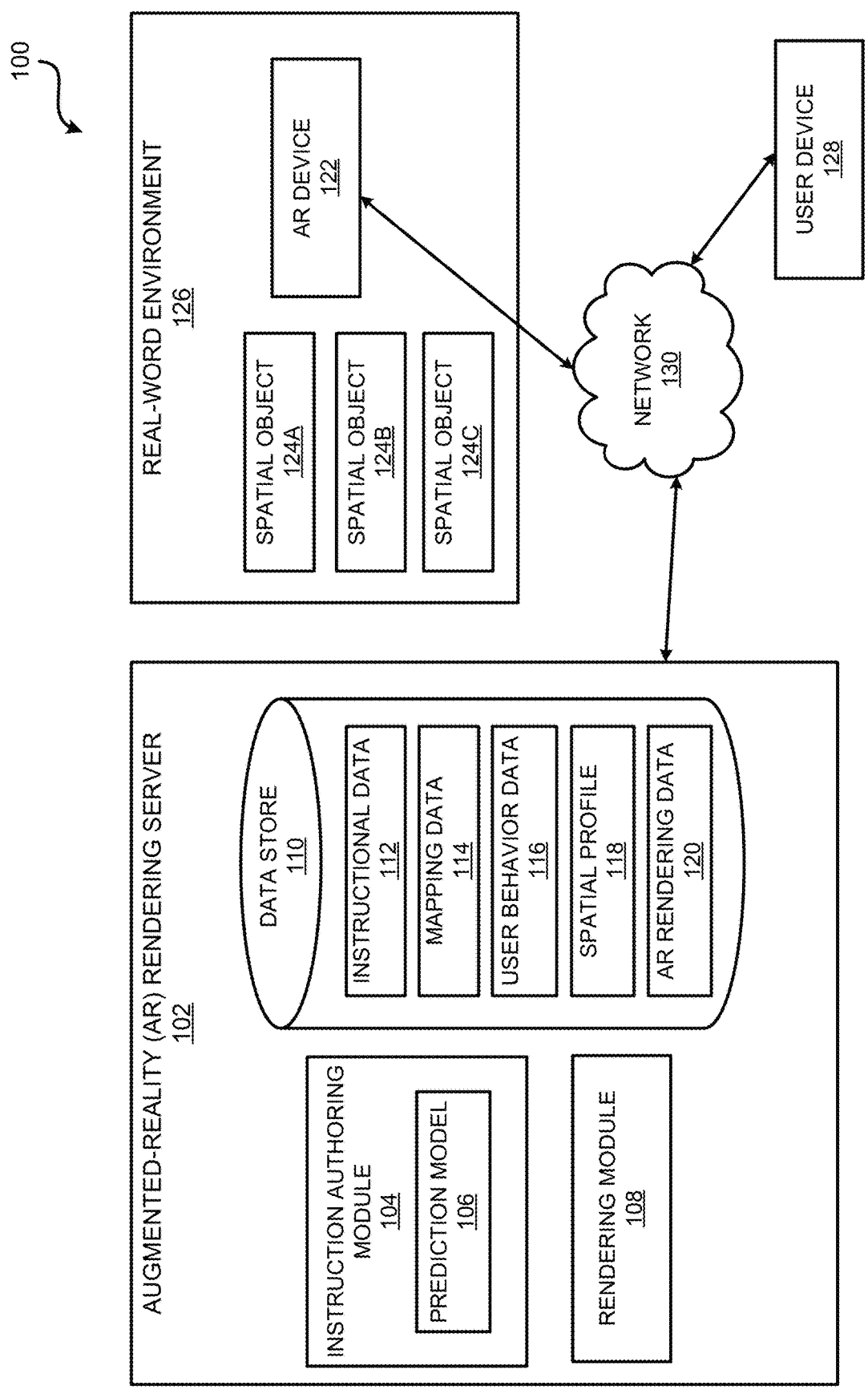
FIG. 1 depicts an example of a computing environment in which an Augmented Reality (AR) rendering server renders instruction steps to be displayed via an AR device, according to certain embodiments of the present disclosure.

Certain embodiments involve rendering and anchoring instructional data in augmented reality (AR) with context awareness. For instance, a computing system receives instructional data to be rendered for displaying via an AR device. The computing system extracts multiple instruction steps from the instructional data and predicts multiple spatial identifiers associated with the multiple instruction steps respectively. The multiple spatial identifiers correspond to multiple spatial objects in a real-world environment. The computing system then renders the multiple instruction steps to be displayed via an AR device at selected locations associated with the multiple spatial objects to generate AR rendering data for the multiple instruction steps. The respective multiple spatial identifiers and a spatial profile of the real-world environment are used for generating the AR rendering data. The AR rendering data is then transmitted to the AR device for displaying.

The following non-limiting example is provided to introduce certain embodiments. In this example, an AR rendering server communicates with an AR device in a real-world environment over a network.

The AR rendering server receives instructional data to be rendered in AR. The instructional data can be contained in a document including multiple instruction steps, such as a cooking recipe with several steps for cooking a particular dish. The document can be received from a scanning device. The scanning device can scan a document in hard copy to create an electronic document and transmit it to the AR rendering server. The document can also be received from a computing device with input devices, such as a keyboard. A user can type out instruction steps in an electronic document at the computing device, and the computing device transmits the electronic document to the AR rendering server.

The AR rendering server then extracts multiple instruction steps from the document and predicts spatial identifiers associated with the multiple instruction steps. A spatial identifier corresponds to a spatial object in a real-world environment where an instruction step is carried out. For example, spatial identifiers associated with instruction steps in a cooking recipe correspond to different objects in a kitchen, such as sink, microwave, countertop, and refrigerator. The kitchen is the real-world environment. The AR rendering server can implement a pre-trained prediction model, such as a Bidirectional Encoder Representations from Transformers (BERT)-based model, for predicting the spatial identifiers. In some examples, a user can edit the predicted spatial identifiers before they are used for rendering the instruction steps in AR.

The AR rendering server then renders the multiple instruction steps to be displayed via the AR device at selected locations associated with the multiple spatial objects. AR rendering data for the multiple instruction steps are generated, which can be displayed in the AR device. The respective multiple spatial identifiers and a spatial profile of the real-world environment can be used for generating the AR rendering data. The spatial profile of the real-world environment can be retrieved from, for example, a cloud storage. Alternatively, or additionally, the AR device can be used to create and update the spatial profile of the real-world environment by scanning spatial objects in the real-world environment to collect geometry data, location data, and identification data for the spatial objects.

The selected locations for anchoring the instruction steps can be determined based on user behavior data associated with respective spatial objects. The user behavior data, such as head pose data and hand gesture data, is collected from previous user interactions with the spatial objects in the real-world environment. The user behavior data can be retrieved from a cloud storage. In some examples, heatmaps are generated to visualize the user behavior data. A heatmap can be generated for an anchoring surface associated with a corresponding spatial object. There can be several anchoring surfaces available for anchoring an instruction step associated with the corresponding spatial object. Each heatmap can visualize the distribution levels of user behavior data related to a corresponding anchoring surface at the corresponding spatial object with different colors or patterns. For example, a higher distribution level represents more head or hand movements associated with the corresponding anchoring surface at the corresponding spatial object; and a lower distribution level represents less head or hand movements. In general, a region or location can be selected for anchoring an instruction step is where the distribution level of the user behavior data is lower than a threshold value. For example, a cooking step can be anchored at a location with less hand activities and not too close to user gaze.

In addition, the AR rendering server may also extract time information from the instruction steps and renders one or more timers for corresponding instruction steps associated with certain spatial objects. For example, one cooking step includes a one-minute duration for cooking on a stove. A one-minute timer can be rendered and displayed at a location near the stove, in addition to the cooking instruction associated with the stove. The rendered timers are also part of the AR rendering data.

The generated AR rendering data is transmitted to the AR device. The AR device scans the real-world environment and align the AR rendering data with the real-world environment. The instruction steps can be displayed sequentially via the AR device at the selected locations associated with spatial objects in the real-world environment. One instruction step is displayed at a time. The instruction steps can transition from one to the next based on user gesture. Alternatively, the user can press an AR button displayed via the AR device for the next step to be displayed.

Certain embodiments of the present disclosure overcome the disadvantages of the prior art, by rendering and anchoring instructional data in augmented reality with context awareness. The proposed process enables a user to view instruction steps in AR at respective associated spatial objects in a real-world environment while performing a certain task. A prediction engine processes the instructional data, which is usually contained in a document, and automatically predicts spatial identifiers associated with respective instruction steps. Thus, a user does not need to parse the abstract content of the document manually to identify each step and its associated spatial object, which is time-consuming. Moreover, the anchoring location for each instruction step is selected based on user behavior data associated with a respective spatial object so that each instruction step can be viewed by the user easily without blocking user gaze nor being occluded by user movements. In addition, the instruction steps in AR are displayed step by step at associated spatial objects to enable a user to follow the steps easily. Overall, the proposed process transforms instructional documents to be more consumable and actionable, and it reduces time for a user to follow the instruction steps and carry out the corresponding task.

Referring now to the drawings, FIG. 1 depicts an example of a computing environment 100 in which an AR rendering server 102 renders instruction steps to be displayed via an AR device 122, according to certain embodiments of the present disclosure. In various embodiments, the computing environment 100 includes an AR rendering server 102 and an AR device 122 in communication over a network 130. The computing environment 100 is configured for rendering instructional data for display via the AR device 122 with context awareness. The network 130 may be a local-area network ("LAN"), a wide-area network ("WAN"), the Internet, or any other networking topology known in the art that connects the AR device 122 to the AR rendering server 102.

The AR rendering server 102 includes an instruction authoring module 104, a rendering module 108, and a data store 110. The instruction authoring module 104 is configured to extract instruction steps from instruction data 112 and determine a spatial identifier associated with each instruction step. The instructional data 112 can be in a format of text, image, video, or audio including instructions (e.g., recipe, manual, guide) for a particular activity. A spatial identifier refers to a spatial object in a real-world environment where a corresponding instruction step is carried out. The instruction steps may be carried out at multiple spatial objects, such as 124A, 124B, and 124C (which may be referred to herein individually as a spatial object 124 or collectively as spatial objects 124), in the real-world environment 126. For example, if the instruction steps are related to cooking, the spatial objects can be sink, microwave, fridge, countertop, and other related objects in the kitchen.

The instruction authoring module 104 is configured to extract individual instruction steps from instructional data 112. The instruction authoring module 104 is configured to convert the instructional data 112 into an interpretable format for extracting individual instruction steps. For example, if the instructional data 112 is video or audio data, the instruction authoring module 104 implements a speech-to-text algorithm to convert the video or audio data to plain text. As another example, if the instructional data 112 is scanned document, the instruction authoring module 104 implements a character recognition algorithm to convert the scanned document to computer-readable characters. The instruction authoring module 104 then processes the plain text or computer-readable characters to extract individual steps.

The instruction authoring module 104 includes a prediction model 106 configured to predict the spatial identifiers associated with corresponding instruction steps. In some examples, the prediction model 106 is a pre-trained natural language processing (NLP)-based model, such as a Bidirectional Encoder Representations from Transformers (BERT)-based model. The predicted spatial identifiers can be editable by a user via a user device 128 connected to the AR rendering server 102 over the network 130. The spatial identifiers are mapped to corresponding instruction steps to create mapping data 114.

The instruction authoring module 104 is also configured to extract time information from corresponding instruction steps. In some examples, some instruction steps may include time information. The instruction authoring module 104 may extract the time information from those instruction steps, for example, by implementing a named entity recognition (NER) algorithm. The extracted time information can also be editable by a user via a user device 128. The mapping data 114 can also include time information associated with corresponding instruction steps.

The rendering module 108 is configured to render the instruction steps at selected locations associated with spatial objects in the real-world environment to generate AR rendering data 120 for displaying via the AR device 122. The AR rendering data 120 includes instruction steps rendered in AR anchored at selected locations associated with corresponding spatial objects in the real-world environment. The AR rendering data 120 can be generated using the mapping data 114, which includes spatial identifiers for corresponding instruction steps, and a spatial profile 118 of the real-world environment 126. The spatial profile 118 of the real-world environment 126 includes geometry data, location data and identity data, which can be collectively called profile data for the spatial objects in the real-world environment. In some examples, the spatial profile 118 of the real-world environment is stored in one or more devices (not shown in FIG. 1) other than the data store 110, such as in a cloud storage. Alternatively, or additionally, an AR device 122 can scan the real-world environment to collect the profile data, including geometry data, location data and identity data, for the spatial objects in the real-world environment, and transmit to the AR rendering server, prior to the rendering module 108 generating AR rendering data. The selected locations for anchoring the instruction steps can be determined based on user behavior data 116. In some examples, the user behavior data 116 includes head pose data and hand gesture data representing user interactions with a corresponding spatial object. The user behavior data 116 can be retrieved from a cloud storage (not shown). The user behavior data 116 may also include visualization data of the user behavior data, such as heatmaps.

The data store 110 is configured to store data processed or generated by the AR rendering server 102. Examples of the data stored in the data store 110 include instruction data 112 to be rendered for displaying via the AR device 122, mapping data 114 including a mapping between spatial identifiers and corresponding instruction steps, user behavior data 116 representing user interactions with corresponding spatial objects, spatial profile 118 for the real-world environment where the instruction steps are carried out, and AR rendering data 120 for displaying the instruction steps via an AR device.

The generated AR rendering data is transmitted to an AR device 122. The AR device 122 is configured to detect spatial objects in the real-world environment where the instruction steps are to be carried out and align the AR rendering data 120 to the spatial objects to display the instruction steps at selected locations. In some examples, the AR device 122 is a head-mounted device configured to display the instruction steps on a see-through display, such as Oculus Quest® HMD. In some examples, the AR device 122 is a projector device configured to project the instruction steps in AR at corresponding spatial objects in the real-world environment.

Figure 2:
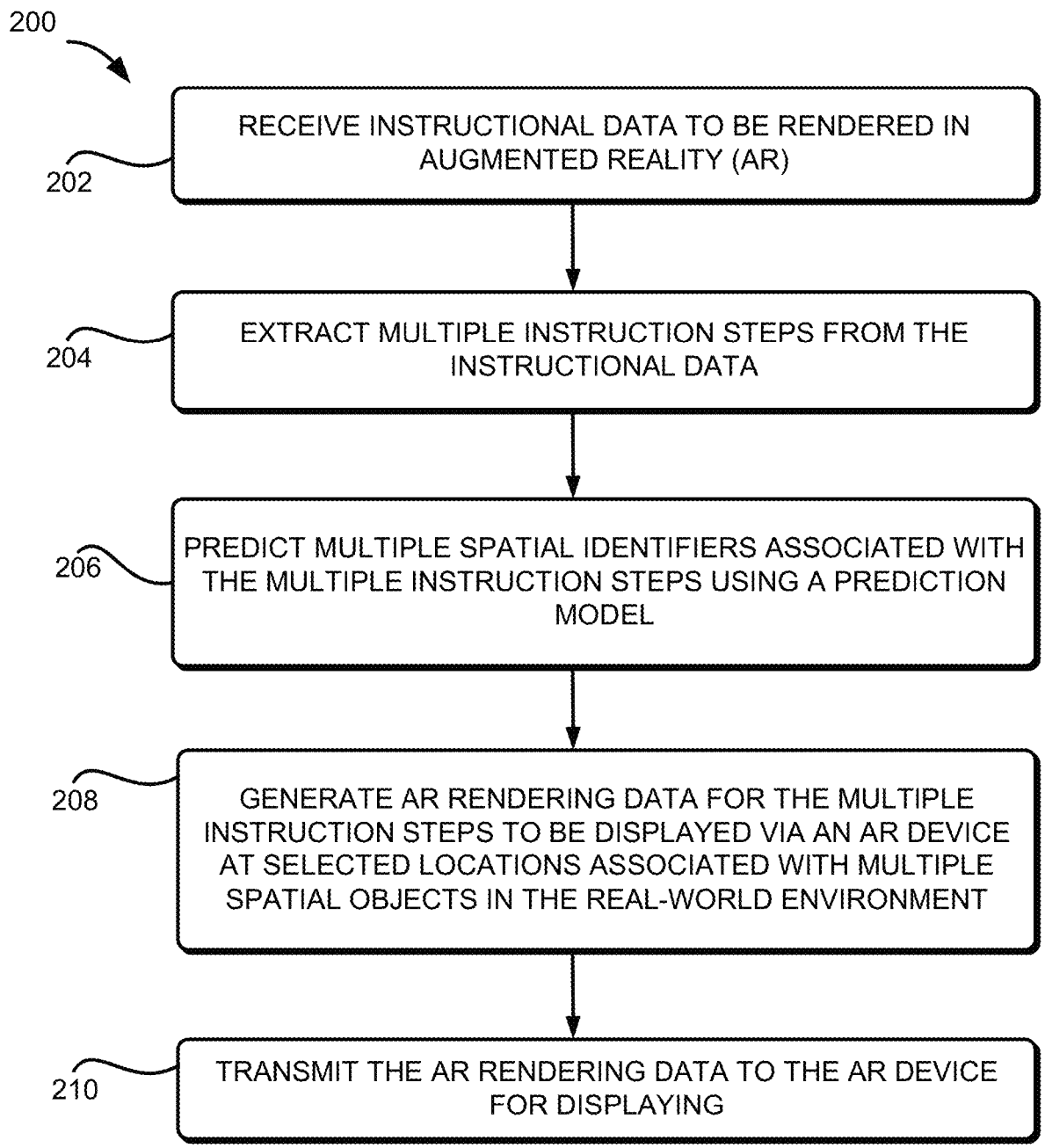
FIG. 2 depicts an example of a process for generating AR rendering data for instructional data to be displayed via an AR device, according to certain embodiments of the present disclosure.

FIG. 2 depicts an example of a process 200 for generating AR rendering data 120 for instructional data 112 to be displayed via an AR device 122, according to certain embodiments of the present disclosure. At block 202, an AR rendering server 102 receives instructional data 112 to be rendered in AR. The instructional data 112 can be a recipe, manual, guide, which contains step-by-step instructions. The instructional data 112 can be in a format of a document, a video clip, an audio clip, or any suitable format to be processed by the AR rendering server 102. In some examples, the instruction authoring module 104 receives the document from a scanning device. The scanning device can scan a document in hard copy to create an electronic document and transmit it to the instruction authoring module 104 on the AR rendering server 102. In some examples, the instruction authoring module 104 receives the document from a user device 128, which can be a computing device (e.g., personal computer, smart phone, tablets) connected or embedded with input devices (e.g., keyboard, touch screen). For instance, a user can type out instruction steps in an electronic document on the user device 128, and the user device 128 transmits the electronic document to the instruction authoring module 104 on the AR rendering server 102. In some examples, the instructional data 112 is stored on a cloud storage, the user device 128 can access the instructional data 112 and transmits it to the AR rendering server 102 for processing.

At block 204, the AR rendering server 102 extracts multiple instruction steps from the instructional data 112. The AR rendering server 102 includes an instruction authoring module 104 for processing the instructional data 112. The instruction authoring module 104 can extract individual instruction steps from the instructional data. In some examples, the instructional data 112 is in a format of a video clip or an audio clip, and the instruction authoring module 104 implements a speech-to-text algorithm to covert video or audio data to text first. In some examples, the instructional data 112 is in a format of a graphical image, and the instruction authoring module 104 implements a machine learning or computer vision algorithm to recognize and describe the images in text. In some examples, the instruction data 112 is a scanned document, and the instruction authoring module 104 implements an Optical Character Recognition (OCR) algorithm, Intelligent Character Recognition (ICR) algorithm, or other suitable recognition algorithms to interpret and convert the instructional data to computer-readable characters. In some examples, the AR rendering server 102 processes the converted text or computer-readable characters to extract instruction steps using a pattern matching algorithm, such as a regular expression (Regex) tool. In addition, time information included in one or more instruction steps can also be extracted. The instruction authoring module 104 can extract time information from an instruction step, for example by implementing a NER algorithm. Similar to predicted spatial identifiers, the extracted time information can be edited by a user via a GUI on a user device 128.

At block 206, the AR rendering server 102 predicts multiple spatial identifiers associated with the multiple instruction steps using a prediction model 106. The instruction authoring module 104 on the AR rendering server 102 is configured to map the multiple instruction steps with spatial objects in the real-world environment where the instruction steps are carried out. The instruction authoring module 104 can implement a prediction model 106 configured to predict spatial identifiers associated with the multiple instruction steps. The prediction model 106 can be trained with a collection of instructions and crowdsourced spatial identifiers until a prediction accuracy is more than 80. Alternatively, or additionally, the prediction model 106 can be trained with a number of instructions and respective spatial identifiers selected from object keywords appeared in the number of instructions. The prediction model 106 can be trained by the AR rendering server 102 or another computing system. The trained prediction model is used to predict spatial identifiers for corresponding instruction steps. The predicted spatial identifiers can be associated with a confidence level. The confidence level can be indicated by color. For example, a green color or a similar color indicates a higher confidence level; and a red color or a similar color indicates a lower confidence level. Alternatively, or additionally, the confidence level can be indicated by number. For example, in a range from 0 to 100, a higher number indicates a higher confidence level, a lower number indicates a lower confidence level. In some examples, the spatial identifiers are edited by a user via a graphical user interface (GUI) on a user device 128 before being used for rendering the instruction steps in AR. The corresponding extracted instruction steps can also be edited by the user. The instruction steps and corresponding spatial identifiers can be stored as mapping data 114. The mapping data 114 can also include the extracted time information for corresponding instruction steps. The time information can be used for rendering a timer for a corresponding instruction step. Functions included in block 206 can be used to implement a step for determining a plurality of spatial identifiers associated with the plurality of instruction steps.

At block 208, the AR rendering server 102 generates AR rendering data 120 for the multiple instruction steps to be displayed via an AR device 122 at selected locations associated with multiple spatial objects 124 in the real-world environment 126. The AR rendering server 102 includes a rendering module 108 configured to render the instruction steps in AR using corresponding spatial identifiers in the mapping data 114 and a spatial profile 118 of the real-world environment 126. The spatial profile 118 of the real-world environment 126 includes geometry data, location data and identity data for the spatial objects in the real-world environment. The rendering module 108 is also configured to determine locations for anchoring the instruction steps in AR associated with the spatial objects 124 in the real-world environment 126. In some examples, the rendering module 108 can select locations for anchoring the instruction steps based on user behavior data collected from user interactions with the corresponding spatial objects for a particular activity. The user behavior data 116 can include head pose data and hand gesture data. Alternatively, or additionally, the user behavior data can include activity data for other parts of the body, such as arms, legs, and feet, associated with a particular activity. In some examples, the user behavior data can be processed to create normalized data to indicate the distribution levels of user behavior at different locations of possible anchoring surfaces associated with a corresponding spatial object. For example, the normalized data can be represented using heatmaps. Each heatmap can visualize distribution levels of user behavior data associated with a corresponding anchoring surface. The heatmaps can be searched to optimize a location for anchoring each instruction step.

For instruction steps that include time information, the rendering module 108 is configured to render a timer based on extracted time information for a corresponding instruction step at a location associated with the corresponding spatial identifier. Similarly, the location for anchoring the timer can be selected based on user behavior data 116 or the heatmaps of the user behavior data 116 for relevant anchoring surfaces associated with a spatial object. Thus, the AR rendering data can also include one or more timers to be displayed in AR at selected locations associated with corresponding spatial objects. Functions included in block 208 can be used to implement a step for generating AR rendering data for the plurality of instruction steps to be displayed via an AR device.

At block 210, the AR rendering server 102 transmits the AR rendering data 120 to the AR device 122 for displaying. The AR rendering data 120 includes instruction steps and selected locations for anchoring the instruction steps. The AR device 122 can download the AR rendering data 120 from the AR rendering server 102. For example, The AR device can fetch the AR rendering server 102 via a Representational State Transfer (REST) application programming interface (API) from the AR rendering server 102 over the network 130. The AR device can display the instruction steps in AR sequentially at selected locations associated with corresponding spatial objects. That is, the instruction steps can be displayed one at a time to avoid clutter and distraction. The instruction steps can transition from one to the next automatically based on user gesture. Alternatively, the user can press an AR button displayed via the AR device for the next step to be displayed. Alternatively, the user can user a controller, which is part of the AR device, to control the display of the instruction steps. The AR device can also display multiple instruction steps at corresponding spatial objects at once to provide an overview for the user, based on user input. In other words, the user can customize the display flow of the instruction steps. In some examples, a user can manually move an instruction step displayed in AR from one location to another.

Figure 3:
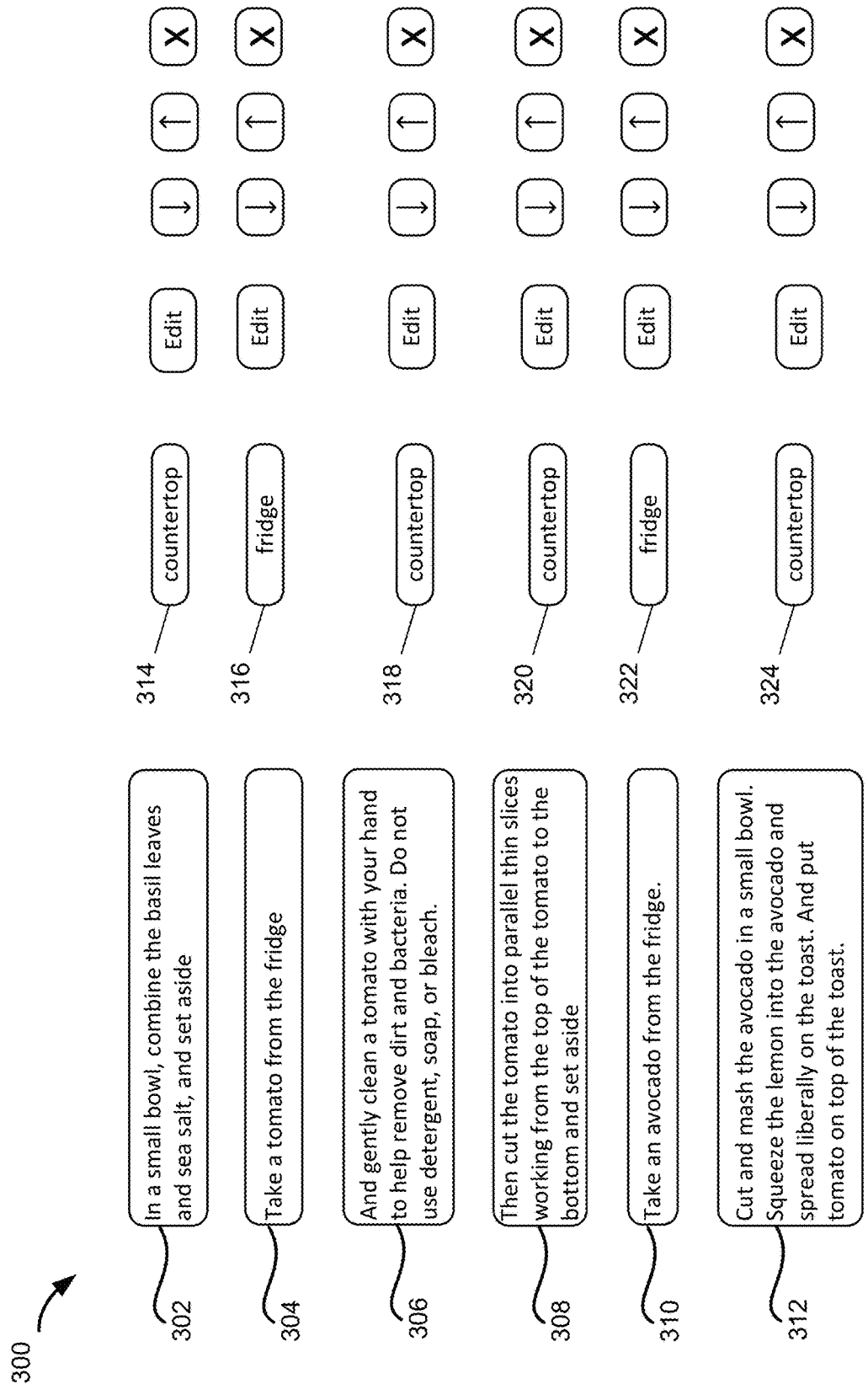
FIG. 3 depicts a graphical user interface (GUI) for editing extracted instruction steps and predicted spatial identifiers, according to certain embodiments of the present disclosure.

FIG. 3 depicts an example of a graphical user interface (GUI) 300 displaying extracted instruction steps and predicted spatial identifiers, according to certain embodiments of the present disclosure. In this example, the instruction data 112 is a cooking recipe. Instruction steps 302-312 are extracted from the cooking recipe. For each instruction step, the prediction model 106 of the instruction authoring module 104 can predict a spatial identifier. For instruction step 302, the predicted spatial identifier 314 is "countertop," which indicates that instruction step 302 is carried out at the countertop in the kitchen. The predicted spatial identifier 316 for instruction step 304 is "fridge," which indicates that instruction step 304 is carried out at the fridge in the kitchen. Similarly, the predicted spatial identifier 318 for instruction step 306 is "countertop," the predicted spatial identifier 320 for instruction step 308 is "countertop," the predicted spatial identifier 322 for instruction step 310 is "fridge," and the predicted spatial identifier 324 for instruction step 312 is "countertop." The extracted instruction steps 302-312 and the corresponding predicted spatial identifiers 314-324 are editable via a graphical user interface (GUI) on a user device 128. A user can edit the content of each instruction step and its predicted spatial identifier. The user can also change the order of the instruction steps by moving up or down an instruction step. Additionally, the user can delete an extracted instruction step.

FIG. 4 depicts an example of a GUI 400 for editing extracted time information, according to certain embodiments of the present disclosure. In this example, an instruction step 402 contains time information. The instruction authoring module 104 can extract time information from the instruction step 402. The extracted time information is used to specify the duration of a timer 404 to be rendered in AR. The duration of the timer 404 can be edited by a user via a GUI 400 on a user device 128. Meanwhile, the user can add additional information, such as a caveat 406, regarding the timer or the instruction step.

Figure 5:
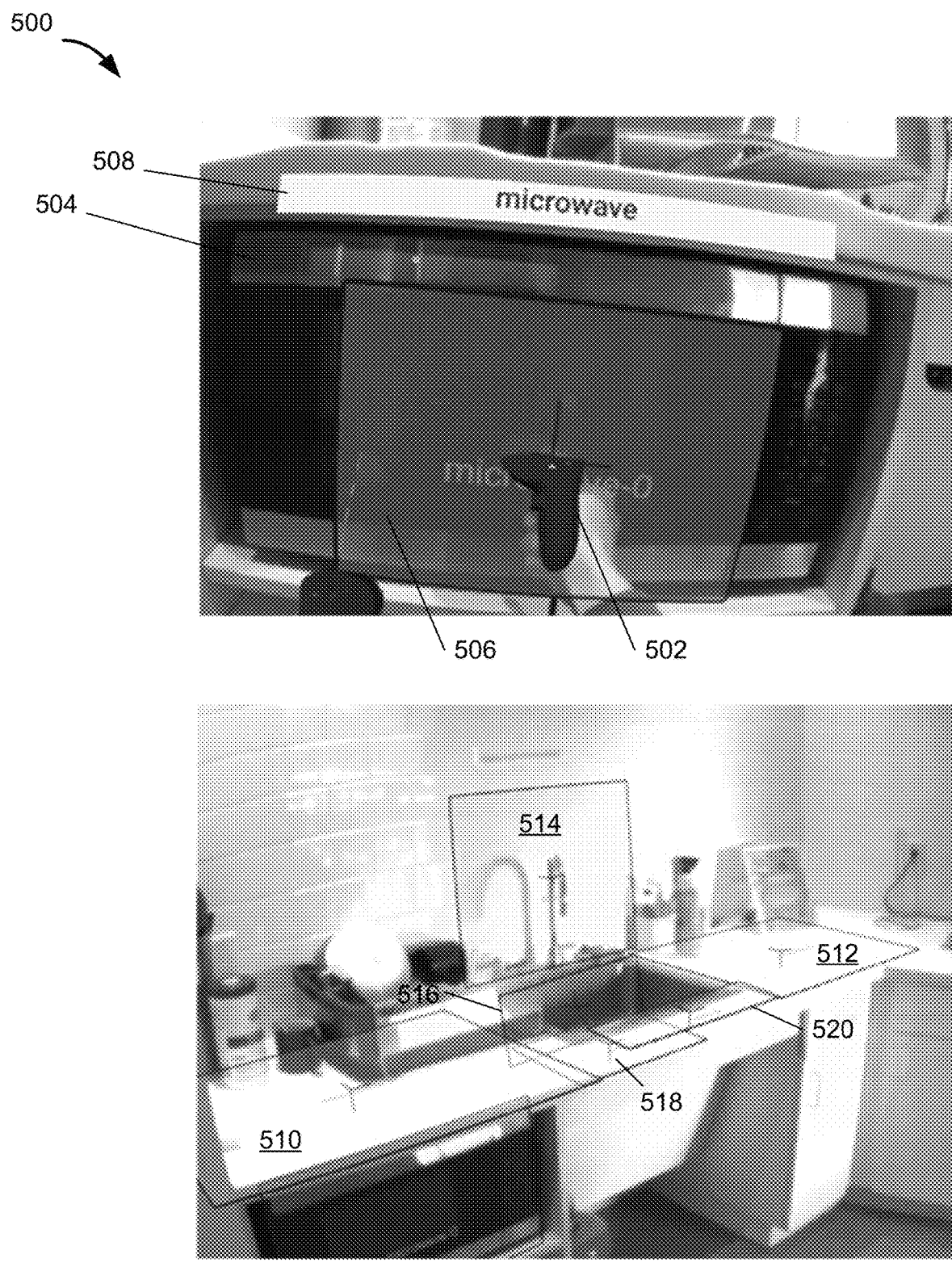
FIG. 5 depicts an example of a process of generating a spatial profile of a kitchen, according to certain embodiments of the present disclosure.

FIG. 5 depicts an example of a process 500 of generating a spatial profile of a kitchen, according to certain embodiments of the present disclosure. In this example, an AR device scans spatial objects in the kitchen to collect profile data, such as geometry data, location data, and identity data, about the spatial objects to generate a spatial profile of the kitchen. The AR device includes an AR headset (not shown) mounted over the eyes of the user and one or more AR controllers 502. The AR device is installed with a client-side application for generating spatial profiles of certain locations in the real-world environment. The AR controller 502 can scan multiple objects in the kitchen to create a spatial profile of the kitchen. For example, AR controller 502 scans a surface over the microwave 504 to generate a bounding box 506 of the microwave 504. The bounding box 506 indicates the location and the geometry of the microwave 504. A user can add one or more tags to the created bounding box via a GUI (not shown) displayed in AR or any suitable input devices. The one or more tags specify identification information about a corresponding spatial object whose bounding box is just created. Here, a tag 508 indicates the spatial object is a microwave. Also for example, the AR controller 502 scans the countertop and created bounding boxes 510 and 512. Yet another example, the AR controller 502 scans the sink and creates bounding boxes 514, 516, 518, and 520. Theses bounding boxes and associated tags are included in the spatial profile of the kitchen. The AR controller 502 is configured to transmit the spatial profile of the kitchen to a cloud storage for later use.

Figure 6:
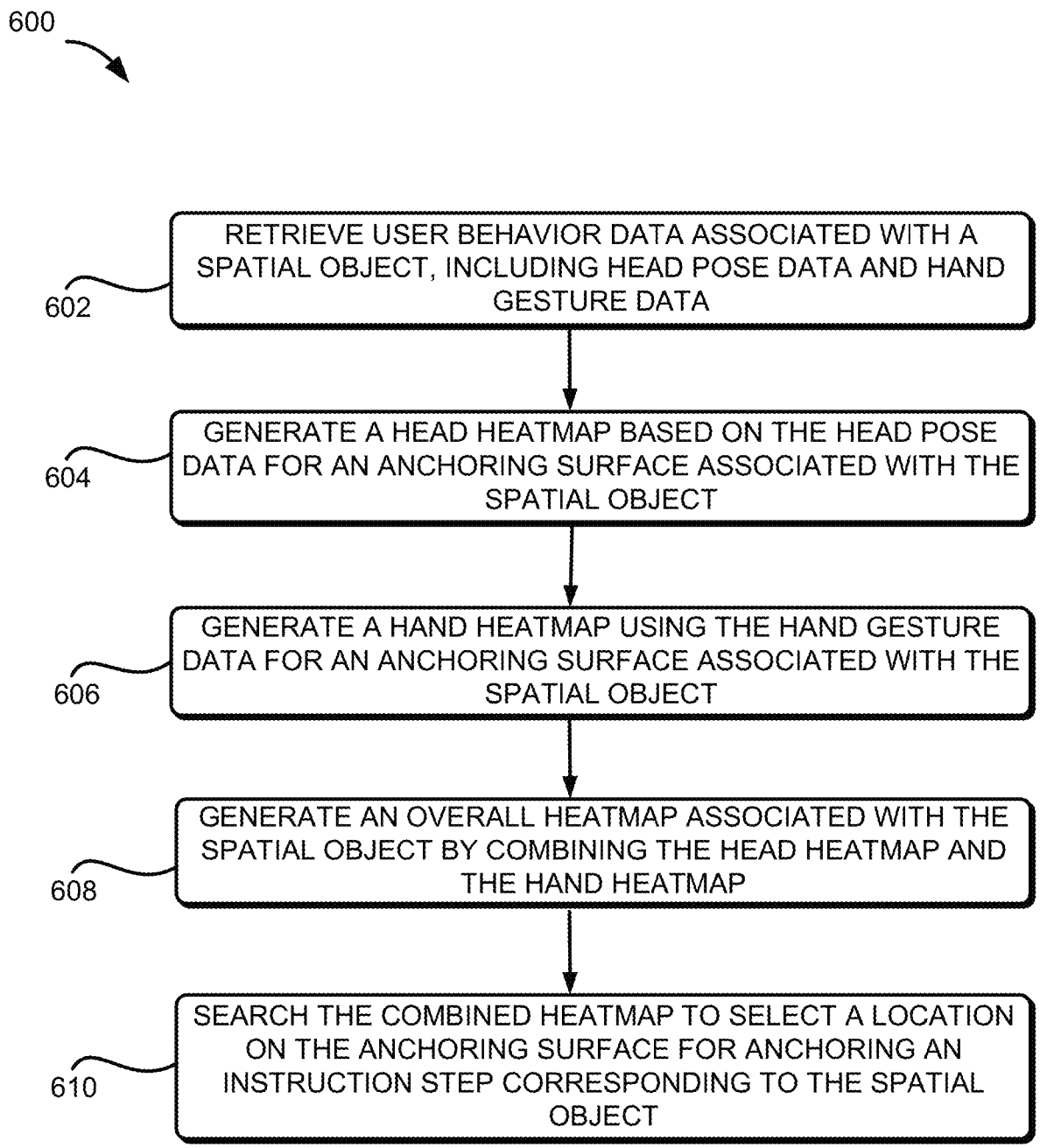
FIG. 6 depicts an example of a process for determining a selected location for anchoring an instruction step near a corresponding spatial object, according to certain embodiments of the present disclosure.

FIG. 6 depicts an example of a process 600 for determining a selected location for anchoring an instruction step near a corresponding spatial object 124, according to certain embodiments of the present disclosure. At block 602, the AR rendering server 102 retrieves user behavior data 116 associated with a spatial object 124. The rendering module 108 of the AR rendering server 102 can be configured to retrieve user behavior data for determining an anchoring location for an instruction step. The user behavior data 116 can include head pose data and hand gesture data. Alternatively, or additionally, the user behavior data can include other data representing user interactions with a spatial object for a particular activity, for example, movement data related to arms, legs, feet, and other body parts that are involved in the particular activity. The user behavior data 116 can be retrieved from a cloud storage, or collected in a real-world environment prior to rendering instruction steps in AR.

At block 604, the AR rendering server 102 generates a head heatmap based on the head pose data for an anchoring surface associated with the spatial object 124. The rendering module 108 of the AR rendering server 102 can be configured to generate a head heatmap for an anchoring surface associated with a spatial object 124. In this example, the head pose data is used as an approximation of a user's gaze. Thus, head pose data is used for generating head heatmaps to approximate the eye heatmaps for anchoring surfaces associated the spatial object 124. Alternatively, or additionally, the user can track eye movements to generate gaze data directly, which may be used to generate eye heatmaps for anchoring surfaces of the spatial object 124. The spatial object 124 many have one or more anchoring surfaces for anchoring a corresponding instruction step. An anchoring surface may not necessarily be the surface of the spatial object. It can be a surface close to the spatial object on different sides of the spatial object. A head heatmap can be generated for each anchoring surface, using head pose data. In some examples, the head pose data includes colliding points of forward direction of head pose on an anchoring surface associated with the spatial object. The distribution of the head pose data can be normalized to generate a head heatmap. In some examples, the head heatmap uses spectral colors representing distribution levels of the head pose data. For example, red regions of the heatmap indicate the highest distribution level of head pose data, and blue regions of the heatmap indicate the lowest distribution level of head pose data. In some examples, the head heatmap uses grayscale representing the distribution levels of head pose data. For example, white regions of the heatmap indicate the highest distribution level of head pose data, and black regions of the heatmap indicate the lowest distribution level of the head pose data. An anchoring location for an instruction step can be selected in a region with higher distribution level of the head pose data, since that is where the user is looking at. Preferably, the instruction step does not block the user from seeing hand activities or other activities by other parts of the body. To optimize the location, additional heatmaps can be generated for other parts of the body, such as hands.

At block 606, the AR rendering server 102 generates a hand heatmap based on the hand gesture data for the anchoring surface associated with the spatial object. The rendering module 108 of the AR rendering server 102 can be configured to generate a hand heatmap for an anchoring surface associated with a spatial object 124. In some examples, the hand gesture data includes colliding points of key joints of palms on a particular anchoring surface associated with the spatial object. In some examples, more than one anchoring surface is associated with a spatial object, and a hand heatmap can be generated for each anchoring surface. Similar to the head heatmap, the hand heatmap can use spectral colors or grayscale representing different distribution levels of the hand gesture data. An anchoring location for an instruction step can be selected in a region with a low distribution level of the hand gesture data, since that region is not occluded by hand activities. In some examples, the rendering module 108 can implement a convex hull algorithm to approximate the region occluded by hand.

At block 608, the AR rendering server 102 generates an overall heatmap for the spatial object by combining the head heatmap and the hand heatmap. In some examples, a combined heatmap is generated by overlaying the head heatmap and the hand heatmap for the same anchoring surface. The head heatmap can indicate regions within the user gaze or outside the user gaze. The hand heatmap can indicate occluded regions by the hand. In some examples, more than one anchoring surface is associated with a spatial object, a combined heatmap can be generated for each anchoring surface. An overall heatmap for a spatial object includes one or more combined heatmaps for corresponding anchoring surfaces associated with the spatial object.

At block 610, the AR rendering server 102 searches the overall heatmap to select a location on the anchoring surface for anchoring an instruction step corresponding to the spatial object 124. In some examples, there are multiple combined heatmaps for corresponding multiple anchoring surfaces associated with a spatial object, the rendering module 108 can search the multiple combined heatmaps to select a location among the multiple anchoring surfaces associated with the spatial object 124. In some examples, the rendering module 108 searches an overall heatmap pixel by pixel with a greedy-based approach to optimize an anchoring location. In other examples, the rendering module 108 implements a simulated annealing algorithm to search an overall heatmap based on probabilities instead of searching every pixel. An optimal location for anchoring an instruction step can be determined by using a cost function. For example, the cost function weights visibility of the instruction step represented by the hand heatmap, readability of the instruction step represented by the head heatmap, and user preference represented by a normalized distance between a user specified location and a server selected location.

Even though the process 600 for determining a selected location for anchoring an instruction step is described in the context of heatmaps, the rendering module 108 may not render a heatmap for visualization but merely process the data constituting the heatmaps to determine the selected location.

Figure 7:
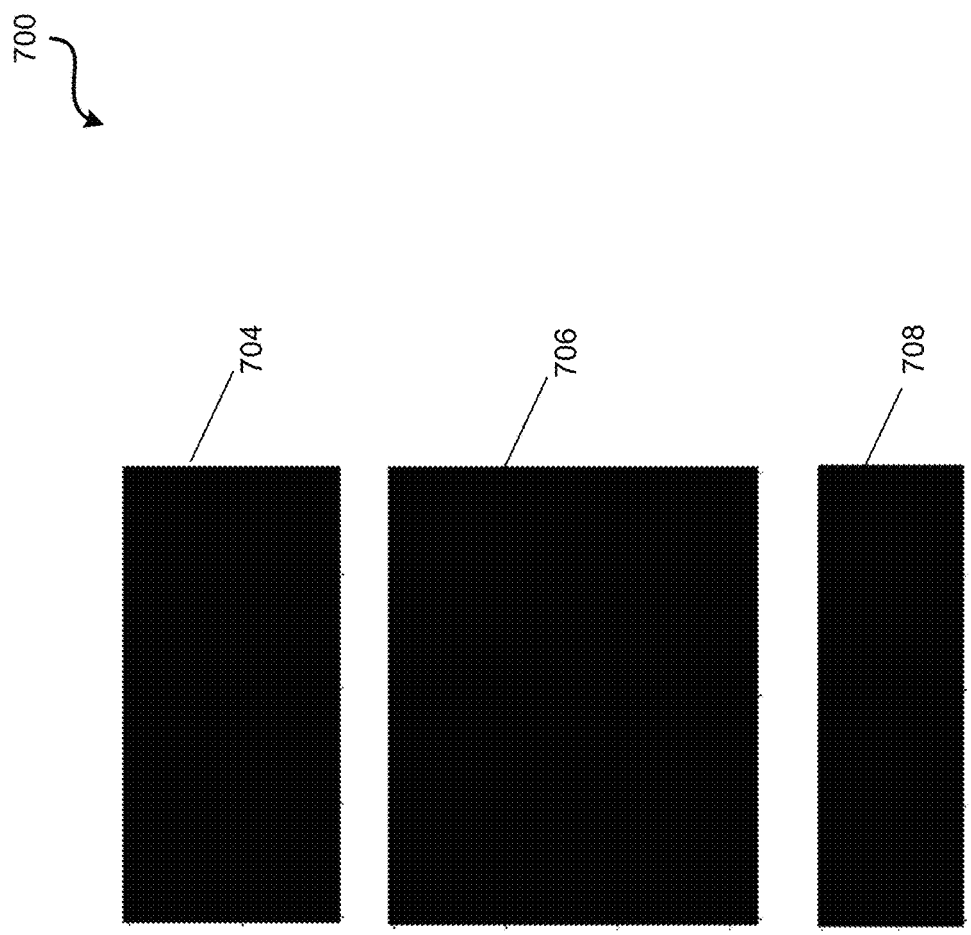
FIG. 7 depicts examples of head heatmaps for anchoring surfaces associated with a sink generated using head pose data, according to certain embodiments of the present disclosure.
Figure 7:
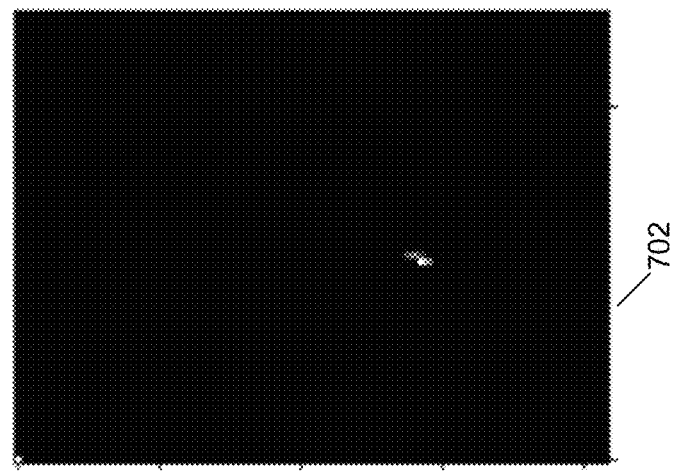

FIG. 7 depicts examples of head heatmaps for anchoring surfaces associated with a sink generated using head pose data, according to certain embodiments of the present disclosure. The head pose data associated with the spatial object can be retrieved from a cloud storage. Alternatively, or additionally, a user can record user interactions with the spatial object for a particular activity to generate user behavior data. The user behavior data includes head pose data, hand gesture data, and movement or position data related to other parts of the body such as arms, legs, and feet that are involved in a particular activity. In this example, heatmaps 702, 704, 706, and 708 are generated based on the head pose data for four anchoring surfaces associated with a sink. The four anchoring surfaces correspond to bounding boxes 514, 516, 518, and 520. Darker areas in heatmaps 702-708 represent a lower distribution level of head pose data, which may be a "bad" region for anchoring an instruction step since an instruction step at this location can block user gaze. Correspondingly, lighter areas, such as the white area in heatmap 702 represent a higher distribution level of head pose data, which can be "good" regions for anchoring an instruction step.

Figure 8:
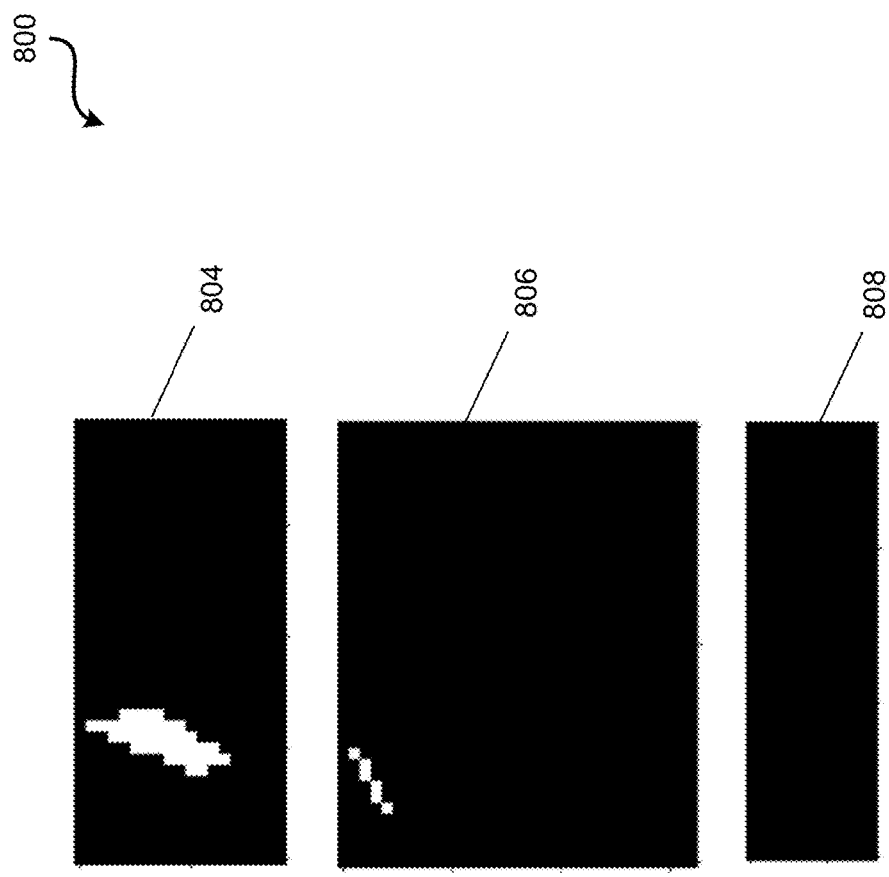
FIG. 8 depicts examples of hand heatmaps for anchoring surfaces associated with a sink generated using hand gesture data, according to certain embodiments of the present disclosure.
Figure 8:

FIG. 8 depicts examples of hand heatmaps for anchoring surfaces associated with a sink generated using hand gesture data, according to certain embodiments of the present disclosure. Similar to the head pose data, the hand gesture data can be retrieved from a cloud storage or generated by recording user interactions with the spatial object for a particular activity. In this example, heatmaps 802, 804, 806, and 808 are generated based on the hand gesture data for four anchoring surfaces associated with a sink. The four anchoring surfaces correspond to bounding boxes 514, 516, 518, and 520. Similar to the head heatmap, a darker area represents a lower level of hand gesture data; but opposite to the head heatmap where a darker area is a "bad" region for anchoring an instruction step, a darker area in a hand heatmap can be a "good" region for anchoring an instruction step since an instruction step displayed at this location is not occluded by hand activity. Correspondingly, a lighter area in a hand heatmap represents a higher level of hand gesture data, which is a "bad" region for anchoring an instruction step. For example, the white area in heatmap 804 is an occluded area by hand, which is not an ideal location for anchoring an instruction step.

Figure 9:
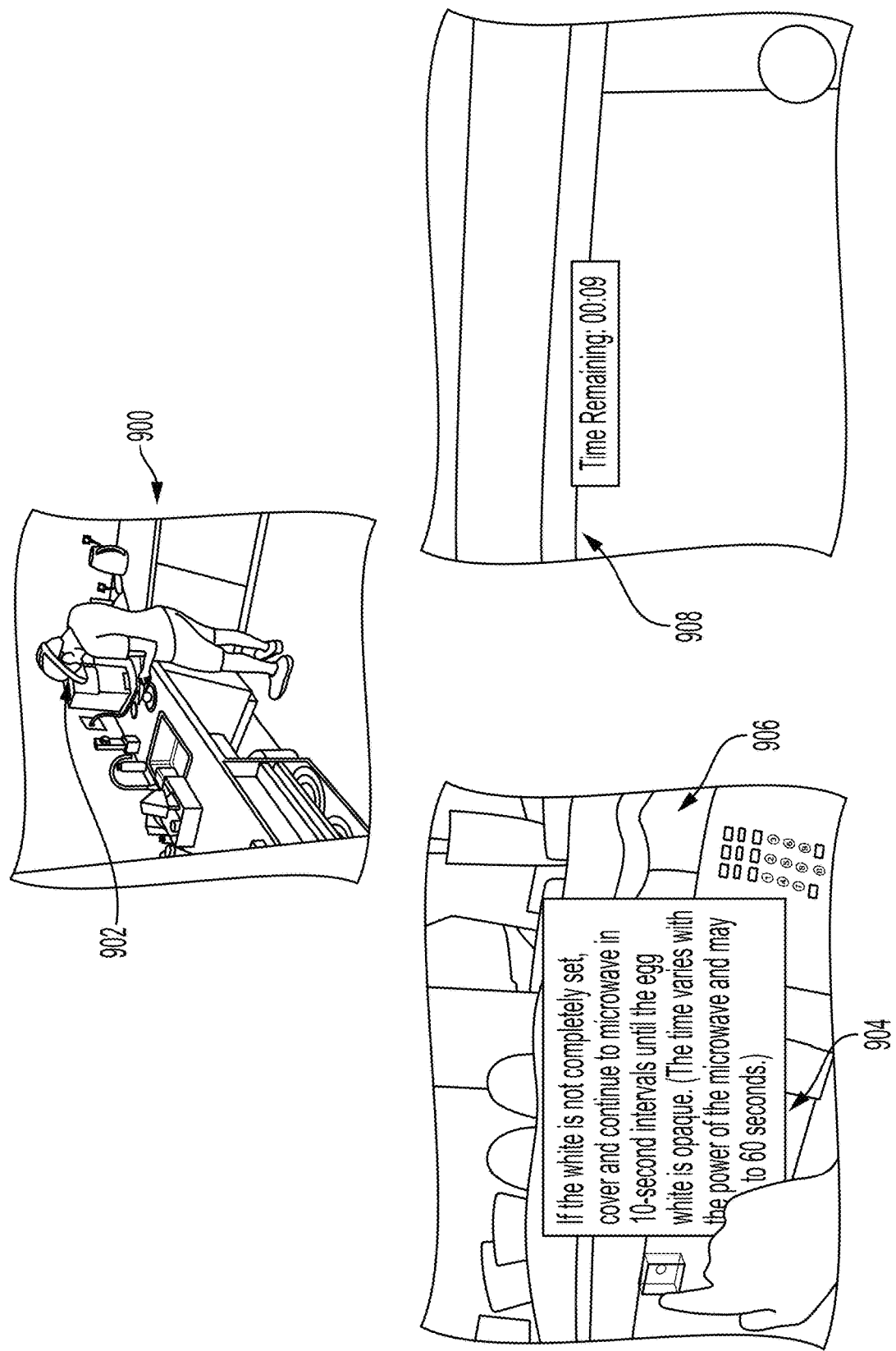
FIG. 9 depicts an example of displaying an instruction step via an AR device at a selected location associated with a corresponding spatial object in a real-world environment, according to certain embodiments of the present disclosure.

FIG. 9 depicts an example of displaying a cooking step via an AR device 122 at a selected location associated with a microwave 906 in a kitchen 900, according to certain embodiments of the present disclosure. A user is wearing an AR device 902 while cooking in the kitchen 900. The AR device 902 is configured to display different cooking steps sequentially at corresponding spatial objects. A cooking step 904 associated with a microwave 906 is displayed at a selected location near the microwave 906. An anchoring location for the cooking step 904 can be selected based on user behavior data around the microwave 906. Here, the selected location for anchoring the cooking step 904 is not blocking the user from seeing the buttons of the microwave nor it is occluded by hand activities. The cooking step 904 includes time information, so a timer 908 is also rendered to display at the microwave 906. Similar to determining an anchoring location for the cooking step 904, an anchoring location for the timer 908 is also determined based on user behavior data associated with the microwave 906 so that the timer 908 does not block the user's view nor it is occluded by hand movements.

Figure 10:
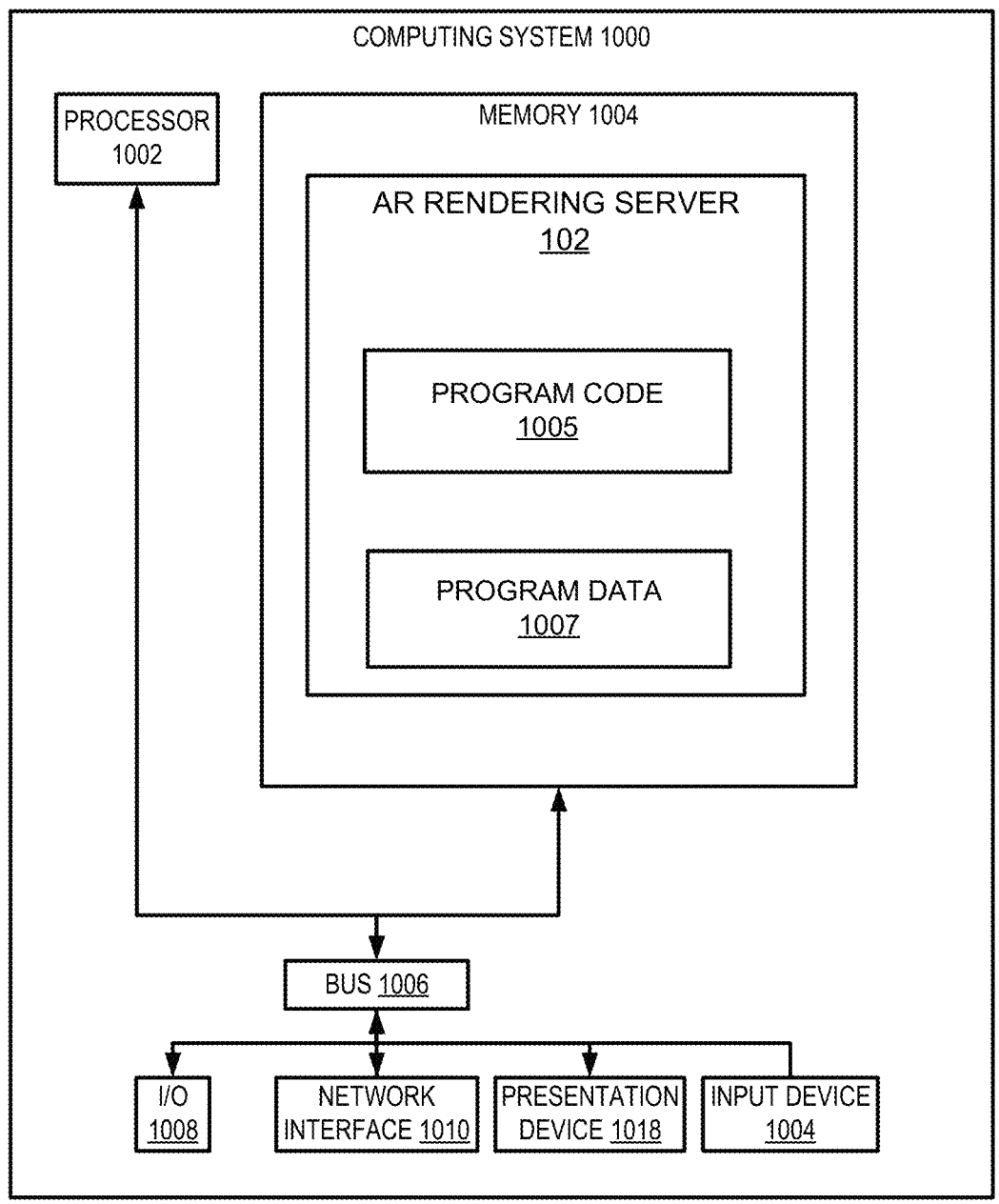
FIG. 10 depicts an example of a computing system for implementing certain embodiments of the present disclosure.

Any suitable computing system or group of computing systems can be used for performing the operations described herein. For example, FIG. 10 depicts an example of the computing system 1000 for implementing certain embodiments of the present disclosure. The implementation of computing system 1000 could be used to implement the AR rendering server 102. In other embodiments, a single computing system 1000 having devices similar to those depicted in FIG. 10 (e.g., a processor, a memory, etc.) combines the one or more operations depicted as separate systems in FIG. 1.

The depicted example of a computing system 1000 includes a processor 1002 communicatively coupled to one or more memory devices 1004. The processor 1002 executes computer-executable program code stored in a memory device 1004, accesses information stored in the memory device 1004, or both. Examples of the processor 1002 include a microprocessor, an application-specific integrated circuit ("ASIC"), a field-programmable gate array ("FPGA"), or any other suitable processing device. The processor 1002 can include any number of processing devices, including a single processing device.

A memory device 1004 includes any suitable non-transitory computer-readable medium for storing program code 1005, program data 1007, or both. A computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 1000 executes program code 805 that configures the processor 1002 to perform one or more of the operations described herein. Examples of the program code 1005 include, in various embodiments, the application executed by the instruction authoring module 104 for determining spatial identifiers for corresponding instruction steps to generate mapping data 114, the application executed by the rendering module 108 for generating AR rendering data for displaying instruction steps at selected locations associated with corresponding spatial objects in a real-world environment, or other suitable applications that perform one or more operations described herein. The program code may be resident in the memory device 1004 or any suitable computer-readable medium and may be executed by the processor 1002 or any other suitable processor.

In some embodiments, one or more memory devices 1004 stores program data 1007 that includes one or more datasets and models described herein. Examples of these datasets include extracted images, feature vectors, aesthetic scores, processed object images, etc. In some embodiments, one or more of data sets, models, and functions are stored in the same memory device (e.g., one of the memory devices 1004). In additional or alternative embodiments, one or more of the programs, data sets, models, and functions described herein are stored in different memory devices 1004 accessible via a data network. One or more buses 1006 are also included in the computing system 1000. The buses 1006 communicatively couples one or more components of a respective one of the computing system 1000.

In some embodiments, the computing system 1000 also includes a network interface device 1010. The network interface device 1010 includes any device or group of devices suitable for establishing a wired or wireless data connection to one or more data networks. Non-limiting examples of the network interface device 1010 include an Ethernet network adapter, a modem, and/or the like. The computing system 1000 is able to communicate with one or more other computing devices (e.g., an AR device 122 or a user device 128) via a data network using the network interface device 1010.

The computing system 1000 may also include a number of external or internal devices, an input device 1020, a presentation device 818, or other input or output devices. For example, the computing system 1000 is shown with one or more input/output ("I/O") interfaces 1008. An I/O interface 1008 can receive input from input devices or provide output to output devices. An input device 1020 can include any device or group of devices suitable for receiving visual, auditory, or other suitable input that controls or affects the operations of the processor 1002. Non-limiting examples of the input device 1020 include a touchscreen, a mouse, a keyboard, a microphone, a separate mobile computing device, etc. A presentation device 1018 can include any device or group of devices suitable for providing visual, auditory, or other suitable sensory output. Non-limiting examples of the presentation device 1018 include a touchscreen, a monitor, a speaker, a separate mobile computing device, etc.

Although FIG. 10 depicts the input device 1020 and the presentation device 818 as being local to the computing device that executes the AR rendering server 102, other implementations are possible. For instance, in some embodiments, one or more of the input device 1020 and the presentation device 1018 can include a remote client-computing device that communicates with the computing system 1000 via the network interface device 1010 using one or more data networks described herein.

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provide a result conditioned on one or more inputs. Suitable computing devices include multi-purpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alternatives to, variations of, and equivalents to such embodiments. Accordingly, it should be understood that the present disclosure has been presented for purposes of example rather than limitation, and does not preclude the inclusion of such modifications, variations, and/or additions to the present subject matter as would be readily apparent to one of ordinary skill in the art.

That which is claimed is:

1. A method performed by one or more processing devices, comprising:
  receiving instructional data to be rendered in augmented reality (AR);
  extracting a plurality of instruction steps from the instructional data;
  predicting a plurality of spatial identifiers associated with the plurality of instruction steps respectively using a prediction model, wherein the plurality of spatial identifiers correspond to a plurality of spatial objects respectively in a real-world environment;
generating one or more heatmaps associated with the plurality of spatial objects based on previous user behavior data associated with the plurality of spatial objects, each heatmap comprising a first region where a distribution level of the previous user behavior data is greater than a threshold value and a second region where the distribution level of the previous user behavior data is less than the threshold value;
selecting an anchoring location for an instructional step from the second region in each heatmap associated with a corresponding spatial object to obtain a plurality of anchoring locations;
generating AR rendering data for the plurality of instruction steps to be displayed via an AR device at the plurality of anchoring locations associated with the plurality of spatial objects based, at least in part, upon the plurality of spatial identifiers and a spatial profile of the real-world environment; and
transmitting the AR rendering data for the plurality of instruction steps to the AR device.

2. The method of claim 1, wherein the instructional data is received from a scanning device.

3. The method of claim 1, wherein the instruction data is received from a computing device.

4. The method of claim 1, wherein the prediction model comprises a pre-trained Bidirectional Encoder Representations from Transformers (BERT)-based model.

5. The method of claim 1, wherein the prediction model is trained with a collection of instructions and crowdsourced spatial identifiers until a prediction accuracy is more than 80%.

6. The method of claim 1, wherein the prediction model is trained with a number of instructions and respective spatial identifiers selected from object keywords appeared in the number of instructions.

7. The method of claim 1, wherein the previous user behavior data collected from user interactions with the plurality of spatial objects.

8. The method of claim 1, wherein the previous user behavior data comprises one or more of head pose data or hand gesture data.

9. The method of claim 1, further comprising:
extracting time information from one or more instruction steps of the plurality of instruction steps; and
rendering one or more timers to be displayed via the AR device associated with the one or more instruction steps.

10. The method of claim 1, wherein the spatial profile for the real-world environment is retrieved from a cloud storage, wherein the spatial profile comprises geometry data, location data, and identity data for the plurality of spatial objects in the real-world environment.

11. The method of claim 1, wherein the AR device is configured to detect the plurality of spatial objects by scanning the real-world environment and display the plurality of instruction steps sequentially at the plurality of anchoring locations associated with the plurality of spatial objects.

12. A system, comprising:
a memory component;
a processing device coupled to the memory component, the processing device to perform operations comprising:
receiving instructional data to be rendered in augmented reality (AR);
extracting a plurality of instruction steps from the instructional data;
determining a plurality of spatial identifiers associated with the plurality of instruction steps respectively, wherein the plurality of spatial identifiers correspond to a plurality of spatial objects in a real-world environment;
generating one or more heatmaps associated with the plurality of spatial objects based on previous user behavior data associated with the plurality of spatial objects, each heatmap comprising a first region where a distribution level of the previous user behavior data is greater than a threshold value and a second region where the distribution level of the previous user behavior data is less than the threshold value;
selecting an anchoring location for an instructional step from the second region in each heatmap associated with a corresponding spatial object to obtain a plurality of anchoring locations;
generating AR rendering data for the plurality of instruction steps to be displayed via an AR device at the plurality of anchoring locations associated with the plurality of spatial objects in the real-world environment; and
transmitting the AR rendering data to the AR device.

13. The system of claim 12, wherein the plurality of spatial identifiers are determined using a prediction model, wherein the prediction model comprises a pre-trained Bidirectional Encoder Representations from Transformers (BERT)-based model.

14. The system of claim 13, wherein the prediction model is trained with a number of instructions and respective spatial identifiers selected from object keywords appeared in the number of instructions.

15. The system of claim 12, wherein the AR rendering data is generated based at least in part upon the plurality of spatial identifiers and a spatial profile of the real-world environment, wherein the spatial profile for the real-world environment is retrieved from a cloud storage, wherein the spatial profile comprises geometry data, location data, and identity data for the plurality of spatial objects in the real-world environment.

16. A non-transitory computer-readable medium, storing executable instructions, which when executed by a processing device, cause the processing device to perform operations comprising:
receiving instructional data to be rendered in augmented reality (AR);
extracting a plurality of instruction steps from the instructional data;
a step for determining a plurality of spatial identifiers associated with the plurality of instruction steps respectively, wherein the plurality of spatial identifiers correspond to a plurality of spatial objects in a real-world environment;
generating one or more heatmaps associated with the plurality of spatial objects based on previous user behavior data associated with the plurality of spatial objects, each heatmap comprising a first region where a distribution level of the previous user behavior data is greater than a threshold value and a second region where the distribution level of the previous user behavior data is less than the threshold value;
selecting an anchoring location for an instructional step from the second region in each heatmap associated with a corresponding spatial object to obtain a plurality of anchoring locations;

a step for generating AR rendering data for the plurality of instruction steps to be displayed via an AR device; and transmitting the AR rendering data for the plurality of instruction steps to the AR device.

17. The non-transitory computer-readable medium of claim 16, wherein the instructional data is received from a scanning device.

18. The non-transitory computer-readable medium of claim 16, wherein the instructional data is received from a computing device.

19. The non-transitory computer-readable medium of claim 16, wherein the operations further comprise:
   extracting time information from one or more instruction steps of the plurality of instruction steps; and
   rendering one or more timers to be displayed via the AR device associated with the one or more instruction steps.

\* \* \* \* \*